United States Patent [19]

Baker

[11] Patent Number: 5,119,946
[45] Date of Patent: Jun. 9, 1992

[54] CANTILEVER TRAY DISPENSER

[75] Inventor: Howard F. Baker, Tulsa, Okla.

[73] Assignee: Jero Manufacturing, Inc., Tulsa, Okla.

[21] Appl. No.: 655,130

[22] Filed: Feb. 14, 1991

[51] Int. Cl.$^5$ .............................................. A47F 7/00
[52] U.S. Cl. ................... 211/59.3; 248/123.1; 108/136
[58] Field of Search ............ 211/59.3; 108/136; 312/42; 248/123.1, 162.1

[56] References Cited

U.S. PATENT DOCUMENTS

| | | | |
|---|---|---|---|
| 2,444,776 | 7/1948 | Kalning et al. | 211/59.3 X |
| 2,468,115 | 4/1949 | Saul, Jr. | 220/93 |
| 2,717,085 | 9/1955 | Waddington | 211/59.3 X |
| 2,816,808 | 9/1957 | Haines | 312/71 |
| 3,082,876 | 3/1963 | Cranmore | 211/59.3 |
| 3,738,722 | 6/1973 | Kooiman | 312/71 |
| 4,449,760 | 5/1984 | House | 312/42 |
| 4,828,119 | 5/1989 | Pingelton | 211/59.3 |

Primary Examiner—David M. Purol
Assistant Examiner—Sarah A. Lechok
Attorney, Agent, or Firm—Head & Johnson

[57] ABSTRACT

A self-leveling dispenser for trays or the like. At least two parallel, hexagonal posts extend longitudinally. A roller mechanism extends between the two posts, the roller mechanism having a plurality of rollers engaging the hexagonal posts in order for the roller mechanism to travel longitudinally along the posts. At least one arm extends from the roller mechanism, the arm adapted to support the trays or the like. A hanger is provided near an end of the hexagonal posts and extension springs extend between the roller mechanism and the hanger to provide an upward force against the downward force of the weight of the trays or the like.

7 Claims, 3 Drawing Sheets

CANTILEVER TRAY DISPENSER

BACKGROUND OF THE INVENTION

1. Field of the Invention

The present invention relates to self-leveling dispensers for trays, cups, glasses or the like. More particularly, the present invention is directed to improvements in lifting mechanisms for self-leveling dispensers.

2. Background of the Invention

Various self-leveling dispensers are known in the food service and grocery industries to dispense stackable items or items held in trays that are stackable.

Springs may be used to provide an upward force against the downward weight of the trays, cups or glasses. As the trays are removed, for instance, the remaining trays will move upward to the same level as the removed trays. Accordingly, the top of the stack remains at a constant level at all times. The amount of upward force may be varied depending on the weight of the items to be dispensed.

Haines U.S. Pat. No. (2,816,808), Kooiman U.S. Pat. No. (3,738,722) and House U.S. Pat. No. (4,449,760) illustrate examples of self-leveling dispensers. In Saul, Jr. U.S. Pat. No. (2,468,115), springs surround cylindrical posts to guide the movement of a shelf.

In a cantilevered arrangement, cylindrical posts have been utilized as guides for rollers. In the typical arrangement, a single roller, radially opposed to the extending cantilever arm travels along a cylindrical post.

It is important that the dispenser operate without twisting the load laterally from side to side.

It is also important, where food is involved, for the equipment used with handling and serving to be kept clean. Ideally, dispensers such as involved herein should have components capable of being exposed for cleaning and inspection.

Accordingly, it is a principal object and purpose of the present invention to provide a cantilever dispenser with a lifting mechanism that operates smoothly without twisting the load laterally.

SUMMARY OF THE INVENTION

The present invention is directed to a cantilever dispenser for trays, glasses, cups or the like. The dispenser includes a base wherein a cabinet extends upright from the base.

A pair of cantilevered arms support a shelf upon which the trays or other items may be placed. The shelf is generally parallel with the base.

A removable center shell extends vertically from the base and fits in a recess therein. A removable cabinet cap covers an opening in the top of the cabinet.

A pair of hexagonal posts, parallel with each other, extend upwardly from the base within the cabinet. Each post has six flat, longitudinally extending walls, which each cover 60° of the entire circumference of the post. A roller mechanism extends between the posts and travels longitudinally along the walls of the post.

The roller mechanism has a plurality of spring openings juxtaposed between the posts. A plurality of springs are retained between the spring openings and a hanger. The hanger has a pair of post caps which fit over the hexagonal posts and support the hanger in place. The hanger is, in turn, secured to the underside of the cabinet cap.

The roller mechanism has an upper shaft and a lower shaft, each of which is vertical to the hexagonal posts.

The cantilever arms each have a notch to allow the arms to rest on the lower shaft. Each cantilever arms terminates in a vertical portion which rests against the upper shaft. Accordingly, downward force on the arms is translated to force upon the shafts.

The cantilever arms and their accompanying shelf may be easily removed from the dispenser without use of tools by raising the forward end of the arms opposite the upstanding portion and then moving the arms away from the dispenser.

The roller mechanism has a pair of towers, each tower having a center opening for receiving one of the hexagonal posts therethrough. Each tower has circular discs which retain bearing brackets. Each post has two load bearing rollers which are linked directly with the upper shaft and the lower shaft. One bearing roller has its axis of rotation coincident with upper shaft and one bearing roller has its axis coincident with the lower shaft.

Additionally, a number of guide rollers are provided, each of which is radially 60° apart from the load bearing rollers.

The device may be constructed so that the roller mechanism is readily accessible for cleaning and repair without the use of tools. Raising the cabinet cap off of the cabinet raises the hanger, the springs, and the roller mechanism from the hexagonal posts.

DETAILED DESCRIPTION OF THE PREFERRED EMBODIMENTS

Figure 1:
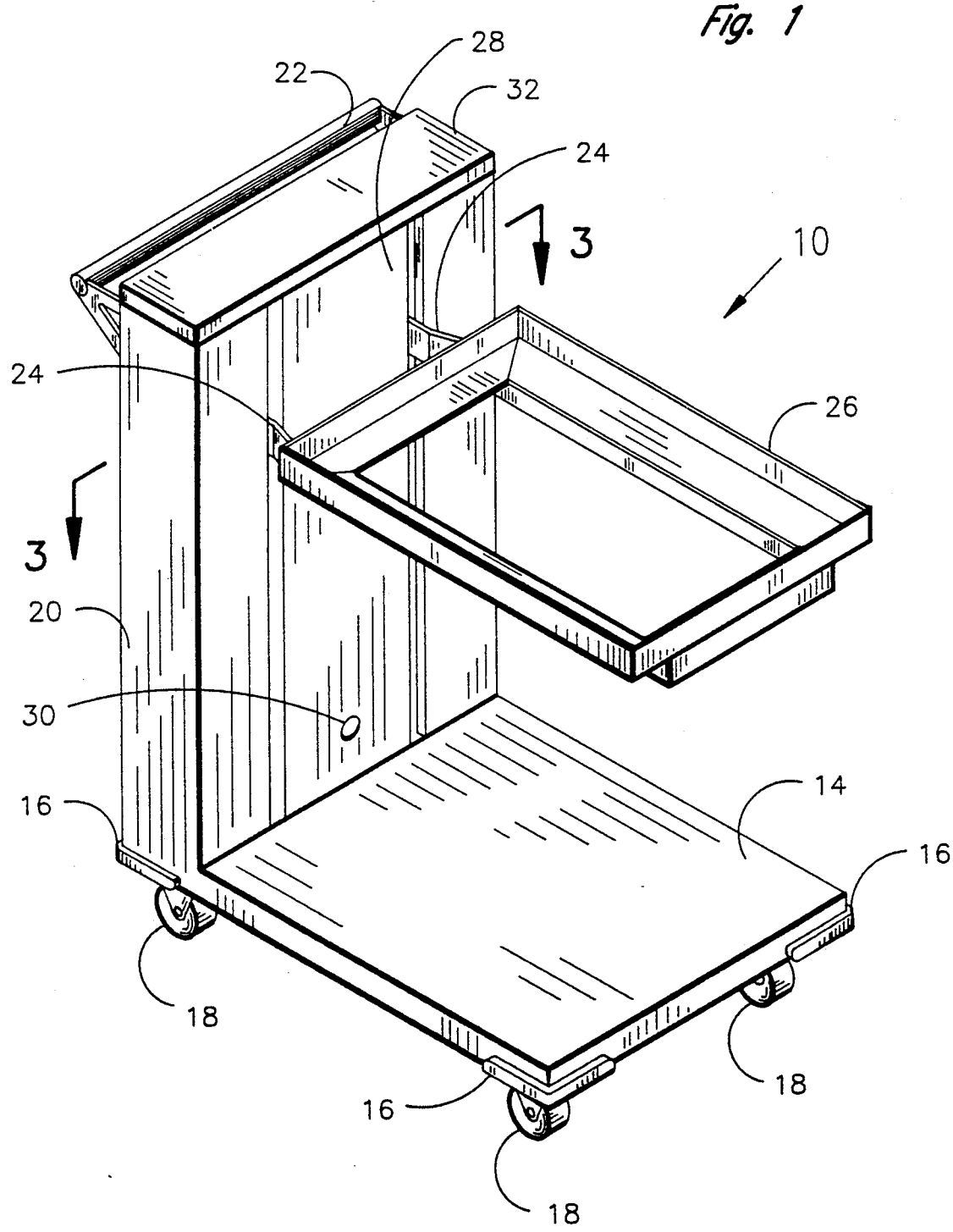
FIG. 1 shows a perspective view of a cantilevered tray dispenser constructed in accordance with the present invention.

Referring to the drawings in detail, FIG. 1 shows a perspective view of a cantilevered tray dispenser. In the embodiment shown, the device has been adapted for use with trays (not shown). It should be understood, however, that the present invention may be utilized with other dispensers requiring self-leveling mechanisms such as cup, glass, beverage, or other dispensers.

The dispenser 10 includes a base 14 which may be covered with stainless steel, aluminum or other material which is resistant to rusting and may be easily cleaned. The base is generally parallel with the floor (not shown). The base 14 may have a series of bumpers 16 at the edges thereof. The dispenser 10 may optionally be provided with a set of wheels 18 or casters so that the entire dispenser is movable and easily portable from one location to another.

Extending upright from the base 14 is a cabinet 20. Extending from the cabinet 20 may be a handle to assist an attendant (not shown) in moving the device.

A pair of cantilever arms 24 support a shelf 26 upon which the trays may be placed. It will be appreciated that the shelf 26 may be adapted according to the items being supported thereon. The shelf 26 is, at all times during operation, generally parallel with the base 14. As the number of trays placed on the shelf 26 is increased, the weight will increase and the shelf 26 will move downward toward the base 14. Conversely, as the number of trays placed on the shelf 26 is decreased, the weight is decreased and the shelf 26 will move upward away from the base 14. Accordingly, the top tray will remain at approximately the same level at all times, convenient to users.

A removable center shell 28 extends vertically from the base 14 and fits in a recess (not shown) therein. A finger hole 30 may be utilized to remove the shell 28 for periodic inspection and cleaning. A space exists between each side of the shell 28 and the cabinet 20. These spaces form two longitudinal slots for the cantilever arms 24. A removable cabinet cap 32 covers an opening in the top of the cabinet 20.

Figure 2:
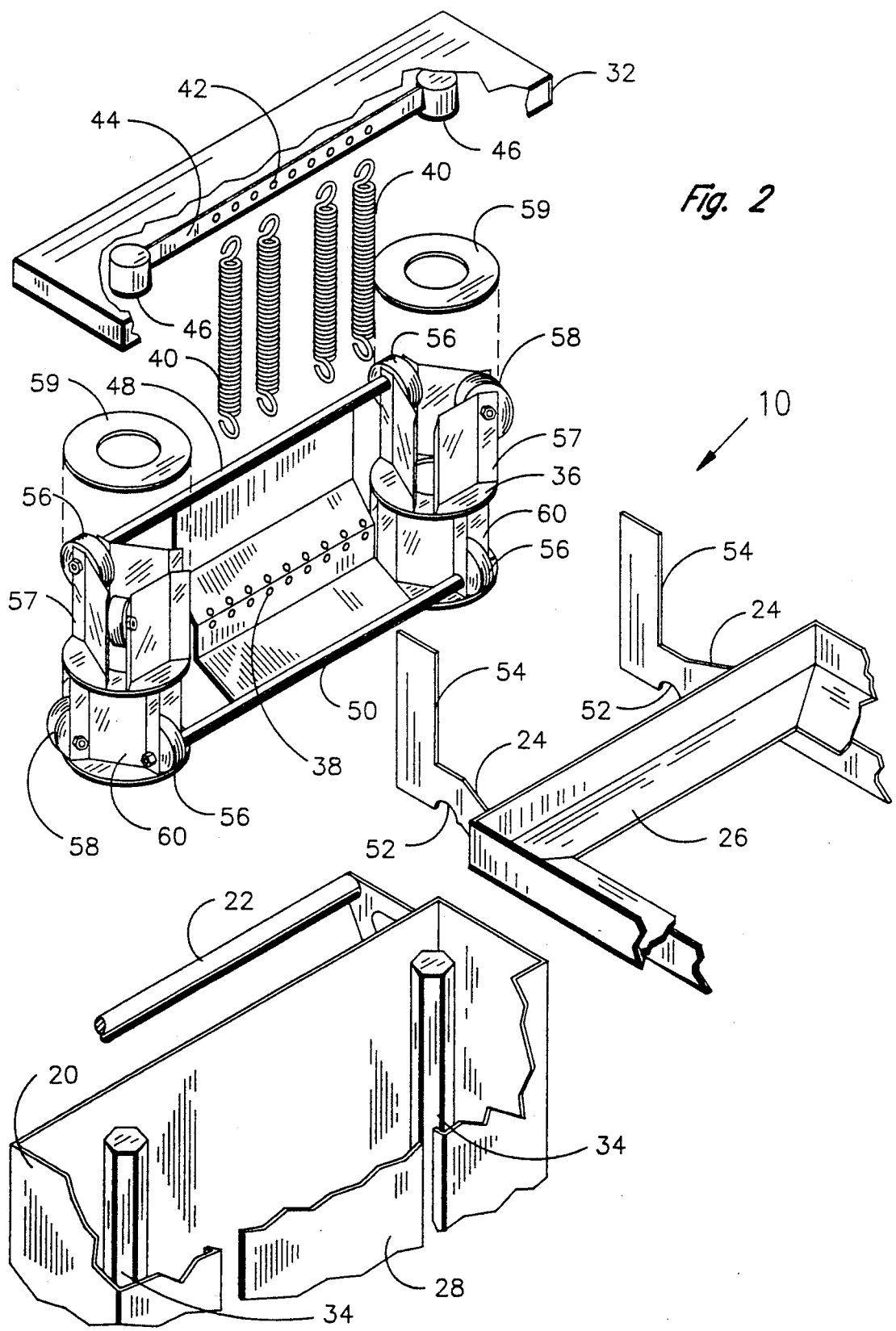
FIG. 2 shows a partial exploded view showing portions cut away of the dispenser shown in FIG. 1.

FIG. 2 illustrates a partial, exploded view of the dispenser.

A pair of hexagonal posts 34, parallel to each other, extend upwardly from the base 14 within the cabinet. Each post 34 has six flat, longitudinally extending walls which each cover 60° of the entire circumference of the post. A roller mechanism 36 extends between the hexagonal posts 34 and travels longitudinally along the walls of the post 34.

The roller mechanism 36 has a plurality of spring openings 38 juxtaposed between the posts. The spring openings are used to secure one end of each extension spring 40. The opposite end of each spring 40 is held in place in opening 42 in a hanger 44. In the present embodiment, the hanger 44 has a pair of post caps 46 which fit over the hexagonal posts 34 and support the hanger 44 in place. The hanger 44 is, in turn, secured to the underside of the cap 32.

Increasing the number of springs will increase the amount of upward force on the roller mechanism and, in turn, the shelf 26. Conversely, decreasing the number of springs decreases the upward force on the roller mechanism.

The roller mechanism 36 has an upper shaft 48 and a lower shaft 50 which are vertical to the hexagonal posts.

The cantilever arms 24 each have a notch 52 to allow the arms to rest on the lower shaft 50. Each cantilever arm 24 terminates in a vertical portion 54 which, when in place, rests against upper shaft 48. The downward force of the weight of the trays on the shelf 26 will, thus, be translated to force on the shafts. Accordingly, movement of the cantilever arms 24 and accompanying shelf 26 will translate to movement of the roller mechanism 36.

As can be appreciated from the foregoing, the cantilever arms 24 and their accompanying shelf 26 may be easily removed from the dispenser without use of tools by simply raising the forward end of the arms 24 opposite to the upstanding portion 54. By so doing, the lower shaft 50 is separated from notch 52 in arms 24. The arms 24 can then be removed by moving the arms 24 and accompanying shelf 26 away from the dispenser.

It will also be appreciated that the downward weight of any trays upon the shelf 26 will be translated to force upon the lower shaft 50 and the upper shaft 48.

The roller mechanism 36 has a plurality of rollers or bearings that engage the walls of the hexagonal posts 34 and travel longitudinally thereon.

The roller mechanism 36 has a pair of towers 57, each of which has a center opening for receiving one of the hexagonal posts. Each tower has three parallel discs 59 which retain bearing brackets 60.

Figure 3:
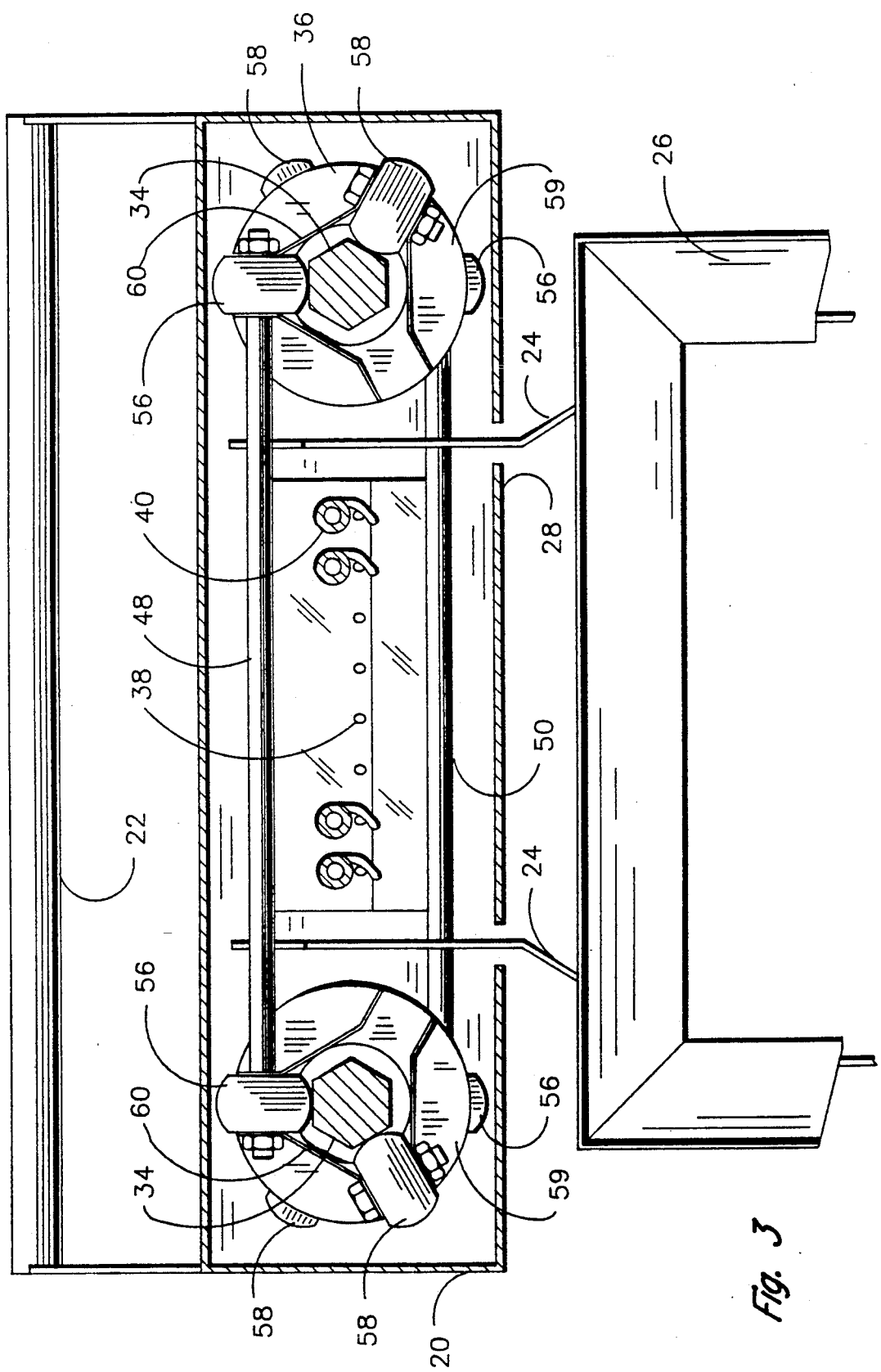
FIG. 3 shows a sectional view taken along section line 3—3 of FIG. 1.

FIG. 3 is a sectional view taken along section line 3—3 of FIG. 1 and shows the roller mechanism 36 and its relationship to the hexagonal posts 34. Each post 34 has two load bearing rollers 56 which are linked directly with the upper shaft 48 and the lower shaft 50. With respect to each hexagonal post, one bearing roller 56 has its axis of rotation coincident with upper shaft 48 and one bearing roller 56 has its axis coincident with lower shaft 50. The load bearing rollers are located 180° radially from each other. The axis of rotation of the load bearing rollers 56 is perpendicular to the cantilever arms 24.

In addition to the load bearing rollers 56, a number of guide rollers 58 are provided. The guide rollers 58 are radially 60° from the load bearing rollers 56. The guide rollers prevent lateral, side to side movement of the arms 24 and shelf 26.

The guide rollers 58 also prevent a problem from arising if the load on the shelf is not evenly distributed. In the absence of the guide rollers, one arm may have a tendency to rise or fall at a different rate than the other arm. The guide rollers prevent the arms and roller mechanism from locking.

It will be observed that the dispenser may be quickly and easily disassembled and reassembled for periodic inspection and cleaning. To disassemble, the cabinet cap 32 with accompanying hanger 44 is lifted upward away from and off of the cabinet 20. Assuming that the cantilevered arms 24 and shelf 26 have already been removed, the springs 40 and lifting mechanism 36 will move upward off of the posts 34 and out of the cabinet 20. The shell 28 will then also be lifted away from the cabinet. The interior of the cabinet is then fully accessible.

To reassemble the dispenser, the reverse operation is performed. The number of springs may be changed at this stage to vary the amount of upward force. The roller mechanism is lowered over the hexagonal posts 34 into the cabinet. After the shell 28 is inserted, the springs and cabinet cap will be repositioned.

Whereas, the present invention has been described in particular relation to the drawings attached hereto, it should be understood that other and further modifications, apart from those shown or suggested herein may be made within the spirit and scope of this invention.

What is claimed is:

1. A self-leveling dispenser for trays or the like which comprises: at least two parallel, hexagonal posts extending longitudinally; roller means extending between at least two said posts, said roller means having a plurality of rollers engaging the exterior walls of said hexagonal posts in order for said roller means to travel longitudinally along said exterior walls of said posts; at least one arm extending from said roller means, said arm adapted for supporting said trays or the like; a hanger near an end of said posts; and at least one extension spring means extending between said roller means and said hanger.

2. A self-leveling dispenser for trays or the like as set forth in claim 1 wherein each hexagonal post has six, flat longitudinally extending walls, each of which covers 60° of the circumference of said post and wherein said rollers travel longitudinally along said walls of said posts.

3. A self-leveling dispenser for trays or the like as set forth in claim 1 wherein the number of spring means may be varied in order to vary the amount of upward force.

4. A self-leveling dispenser for trays or the like as set forth in claim 1 wherein said hangar may be detachably connected to said posts and whereby said hanger, said spring means and said roller means may be removed from said dispenser for periodic cleaning and inspection without use of tools.

5. A self-leveling dispenser for trays or the like as set forth in claim 1 wherein said roller means includes a tower with a center opening therethrough for each said hexagonal post, said tower having bearing brackets which retain said rollers therein.

6. A self-leveling dispenser for trays or the like as set forth in claim 2 wherein said roller means includes two opposed bearing rollers for each said hexagonal post, each said bearing roller having an axis of rotation perpendicular to said arm.

7. A self-leveling dispenser for trays or the like as set forth in claim 2 having two said hexagonal posts and two arms extending from said roller means, said arms supporting a shelf for trays or the like.

* * * * *